(12) United States Patent
Ronkainen

(10) Patent No.: US 9,170,649 B2
(45) Date of Patent: Oct. 27, 2015

(54) AUDIO AND TACTILE FEEDBACK BASED ON VISUAL ENVIRONMENT

(75) Inventor: Sami P. Ronkainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 880 days.

(21) Appl. No.: 12/005,830

(22) Filed: Dec. 28, 2007

(65) Prior Publication Data

US 2009/0167701 A1 Jul. 2, 2009

(51) Int. Cl.
*G06F 3/01* (2006.01)
*G06F 3/0488* (2013.01)

(52) U.S. Cl.
CPC ............ *G06F 3/016* (2013.01); *G06F 3/04886* (2013.01)

(58) Field of Classification Search
USPC ...................... 345/156–183; 178/18.01–20.04
See application file for complete search history.

(56) References Cited

U.S. PATENT DOCUMENTS

| | | | | |
|---|---|---|---|---|
| 6,400,996 | B1 * | 6/2002 | Hoffberg et al. ................. | 700/83 |
| 6,469,695 | B1 * | 10/2002 | White ............................ | 345/173 |
| 6,822,635 | B2 * | 11/2004 | Shahoian et al. ............. | 345/156 |
| 7,084,859 | B1 * | 8/2006 | Pryor ............................ | 345/173 |
| 2001/0035854 | A1 | 11/2001 | Rosenberg et al. ........... | 345/156 |
| 2004/0233167 | A1 * | 11/2004 | Braun et al. ................... | 345/163 |
| 2006/0192771 | A1 * | 8/2006 | Rosenberg et al. ........... | 345/173 |
| 2006/0238510 | A1 * | 10/2006 | Panotopoulos et al. ....... | 345/168 |
| 2008/0073131 | A1 * | 3/2008 | Cruz-Hernandez et al. .......................... | 178/18.05 |
| 2009/0102805 | A1 * | 4/2009 | Meijer et al. .................. | 345/173 |

OTHER PUBLICATIONS

"Skin of the Teeth", accessed on Aug. 1, 2013 at http://www.elasmo-research.org/education/white_shark/scales.htm.*
"Cat Anatomy", accessed on Aug. 5, 2013 at http://en.wikipedia.org/Cat_anatomy.*
www.imerson.com (Texture Effect) pp. 1-2.
www.reachin.se (Reachin API) pp. 1-2.
www.sensable.com (Software and devices that add the sense of touch to the digital world).

* cited by examiner

*Primary Examiner* — Ryan A Lubit
(74) *Attorney, Agent, or Firm* — Harrington & Smith

(57) ABSTRACT

Disclosed herein is an apparatus. The apparatus includes a housing section, electronic circuitry, a touch screen, and a user sensory feedback system. The electronic circuitry is mounted within the housing section. The touch screen is on the housing section. The touch screen is configured to sense a touch at an area of the touch screen. The electronic circuitry is configured to analyze a feature displayed at the area of the touch screen. The user sensory feedback system is proximate the housing section. The user sensory feedback system is configured to perform an operation based, at least partially, upon the touch at the area of the touch screen and upon an image analysis of the feature at the area of the touch screen.

24 Claims, 7 Drawing Sheets

AUDIO AND TACTILE FEEDBACK BASED ON VISUAL ENVIRONMENT

BACKGROUND OF THE INVENTION

1. Field of the Invention

The invention relates to an electronic device and, more particularly, to audio and tactile feedback based on a visual environment of an electronic device.

2. Brief Description of Prior Developments

Many electronic device manufacturers provide touch screens for basic user interface (UI) control (e.g. icon selection, screen scrolling, etc.). As consumers demand increased functionality from electronic devices, there is a need to provide improved devices having increased touch screen capabilities. Currently there are many research activities studying how haptic feedback could be used in electronic devices. Electronic devices having tactile feedback are known in the art. For example, U.S. Patent Application Publication No. 2006/0192771 discloses a touch pad having tactile feedback. Immersion Corporation has introduced a concept where a computer mouse has tactile feedback. One such mouse has been productized by Logitech. And, Reachin Technologies AB sells a programming toolkit for tactile application systems based on expensive 3D haptic devices, such as the Phantom® Device (by SensAble Technologies, Inc).

The demand for continuous size miniaturization generates challenges to implement added touch screen functionality. Accordingly, there is a desire to provide an improved touch screen user interface with feedback capabilities for an electronic device.

SUMMARY OF THE INVENTION

In accordance with one aspect of the invention, an apparatus is disclosed. The apparatus includes a housing section, electronic circuitry, a touch screen, and a user sensory feedback system. The electronic circuitry is mounted within the housing section. The touch screen is on the housing section. The touch screen is configured to sense a touch at an area of the touch screen. The electronic circuitry is configured to analyze a feature displayed at the area of the touch screen. The user sensory feedback system is proximate the housing section. The user sensory feedback system is configured to perform an operation based, at least partially, upon the touch at the area of the touch screen and upon an image analysis of the feature at the area of the touch screen.

In accordance with another aspect of the invention, an apparatus is disclosed. The apparatus includes a housing section, electronic circuitry, a touch screen, and a user sensory feedback system. The electronic circuitry is mounted within the housing section. The touch screen is on the housing section. The touch screen is configured to sense a touch at an area of the touch screen. The electronic circuitry is configured to determine a first texture direction of a feature displayed at the area of the touch screen. The electronic circuitry is configured to determine a second different texture direction of the feature displayed at the area of on the touch screen. The user sensory feedback system is proximate the housing section. The user sensory feedback system is configured to operate in a first mode in response to the touch at the area of the touch screen and the first texture direction of the feature displayed at the area of the touch screen. The user sensory feedback system is configured to operate in a second different mode in response to the touch at the area of the touch screen and the second texture direction of the feature displayed at the area of the touch screen.

In accordance with another aspect of the invention, a method is disclosed. A touch is sensed at an area of a touch screen. A feature displayed at the area of the touch screen is analyzed. A user sensory feedback system is operated in response to the touch at the area of the touch screen and an image analysis of the feature at the area of the touch screen.

In accordance with another aspect of the invention, a method is disclosed. A touch is sensed at an area of a touch screen. A first texture direction of a feature displayed at the area of the touch screen is determined. A second different texture direction of the feature displayed at the area of the touch screen is determined. A user sensory feedback system is operated in a first mode in response to the touch at the area of the touch screen and the first texture direction of the feature displayed at the area of the touch screen. The user sensory feedback system is operated in a second different mode in response to the touch at the area of the touch screen and the second texture direction of the feature displayed at the area of the touch screen.

In accordance with another aspect of the invention, a program storage device readable by a machine, tangibly embodying a program of instructions executable by the machine for performing operations to provide feedback based on a feature displayed on a touch screen is disclosed. A touch at an area of the touch screen is sensed. A feature displayed at the area of the touch screen is analyzed. A user sensory feedback system is operated based, at least partially, upon the sensed touch at the area of the touch screen and upon a determined texture direction and/or or a graphical change, at the analyzed feature displayed at the area of the touch screen.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
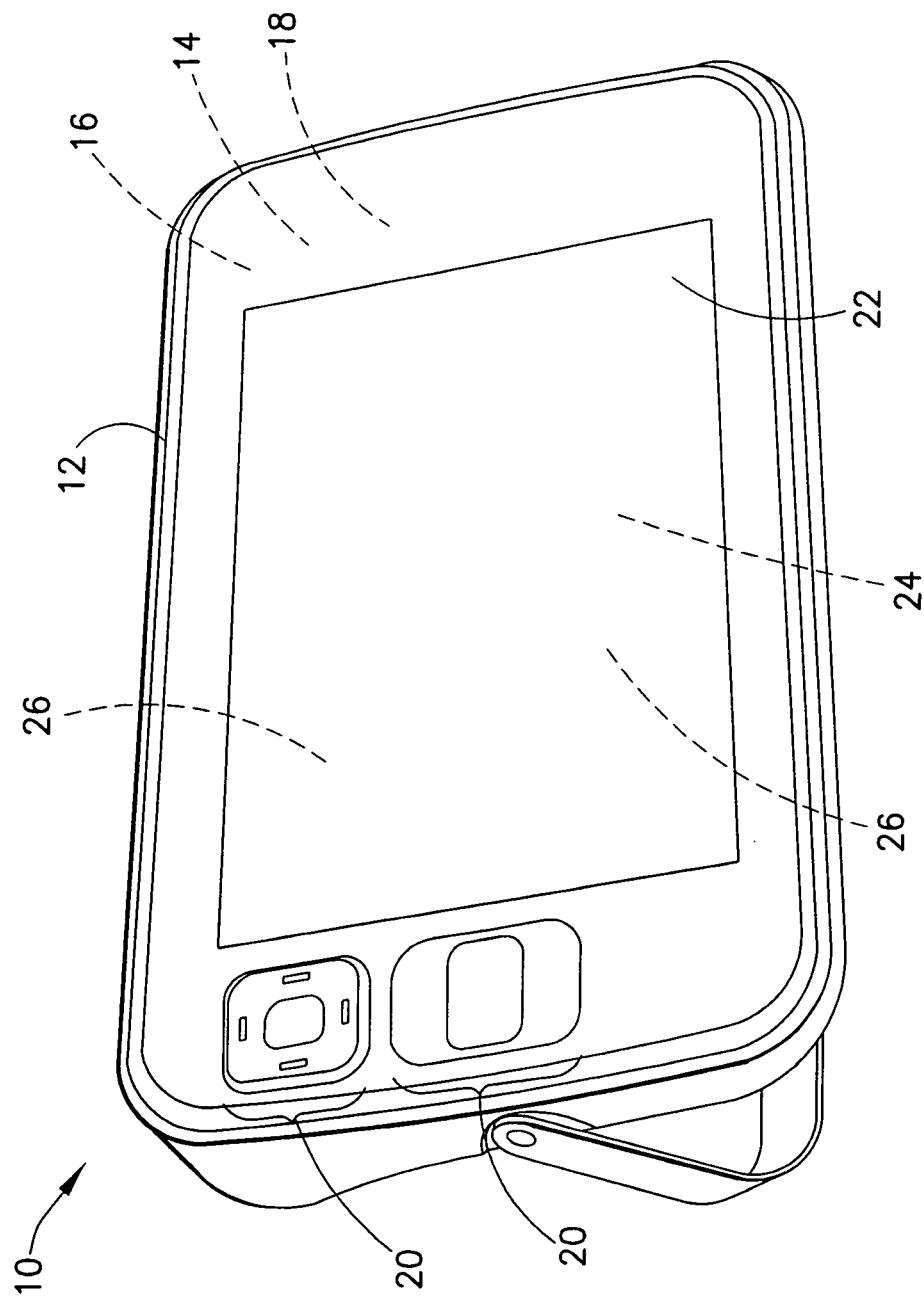
FIG. 1 is a perspective view of an electronic device comprising features of the invention.

Referring to FIG. 1, there is shown a perspective view of an electronic device 10 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

In this embodiment the device 10 comprises an internet tablet device. However, in alternate embodiments the device could comprise any suitable type of electronic device. For example, the device 10 could comprise a mobile phone, a digital camera, a music player, a hand-held gaming device, a PDA, or a notebook computer. The device 10 generally comprises a housing section 12, a transceiver 14 connected to an antenna 16, electronic circuitry 18, such as a controller for example, within the housing 12, user input regions 20 and a display 22. In alternate embodiments, the device 10 can have any suitable type of features as known in the art. In the embodiment shown the device 10 comprises user input regions 20 and a single display 22. However, alternate embodiments may comprise any suitable number of displays or user input regions. Additionally, the user input region may comprise a keypad for example.

The display 22 is able to display various application displays and information including, for example, digital pictures, Internet web site pages, application control screen and menus. These are only some examples and should not be considered as limiting. In addition to being able to function as a display screen, the display 22 is a touch screen adapted to sense touch or depression of the display by a user's finger or a stylus. Thus, the display 22 forms a touch screen user interface which may be used for basic user interface (UI) control (e.g. icon selection, screen scrolling, etc.).

The disclosed device 10 provides for a user sensory feedback system 24 to be incorporated into the touch screen 22. The user sensory feedback system may utilize haptic technology for example. Haptic technology refers to technology which interfaces the user via the sense of touch by applying forces, vibrations and/or motions to the user. For instance, a transducer or actuator 26 of the user sensory feedback system 24 can be placed underneath the touch screen 22, generating feedback when the user presses virtual buttons on the screen 22. The transducer or actuator 26 may be a piezoelectric actuator. Piezoelectricity is the ability of crystals to generate a voltage in response to applied mechanical stress. The piezoelectric effect is reversible in that piezoelectric crystals, when subjected to an externally applied voltage, can change shape by a small amount. The feedback can be made to plausibly simulate a real physical dome being under the button, thus creating a piezoactuator-based texture simulation or motion simulation.

It should be noted that the user sensory feedback system 24 may comprise any suitable type of transducer or actuator that can give audio and/or tactile feedback to the user at the moment the user presses the touch screen 22. For example, the transducer/actuator 26 can be an electroacoustic transducer such as a loudspeaker, or an electromechanical transducer such as a vibrator/actuator/haptics device. Additionally, it should be noted that alternate embodiments may comprise any suitable number of transducers and/or actuators.

The output of the piezoelectric actuator 26 can be dynamic and easily programmed. The disclosed device 10 utilizes the piezoelectric actuator 26 to produce a simulation of physical materials on the touch screen 22, when the user moves a finger or a stylus on the screen 22.

For instance, consider a situation where there is a photograph used as a background image on the touch screen 'desktop', and there is a large white window with clear borders on top of it. Now, when the user moves the stylus on the background image, the piezoelectric actuator 26 is used to cause a bit of tremble on the screen 22 so that the background feels bumpy. When the stylus moves across the window border, there is a clear 'click' so that the user feels that there is a clear, sharp edge. When dragging the stylus on the window background, no tremble is generated, causing an illusion of a flat material that the window could comprise.

With well chosen materials for the stylus tip, and the touch screen 22, even friction could be simulated. If the tip of the stylus is made out of rubber (i.e. high friction between the stylus and the screen 22), dragging it requires a bit of force. Then, causing the screen 22 to tremble a bit would make the stylus tip bounce off the screen 22 a bit all the time, making it lighter to drag it, generating an illusion of a more slippery surface.

Operation of the disclosed device 10 having the user sensory feedback system 24 first comprises starting the device 10 in a powered-up state. Preferably, the analysis of the screen 22 contents (i.e. generating the instructions for how the acoustic/haptic actuator(s) 26 should be driven when the user touches a point on the screen 22) would be done before a touch happens, to minimize the latency between the touch, and the time at which the output is generated.

To do this, every time the screen 22 contents have changed, the screen 22 contents are analysed (at least in the areas that changed), surrounding each point on screen 22. For instance, a texture analysis algorithm can be run that analyzes the roughness in a pre-defined (e.g. 10 by 10 pixels) area around each point on screen 22. Or an edge detection algorithm can be run for example. It should be noted that the screen 22 may display visual information such as a still image, a moving picture or a video, for example. It should also be noted that the visual information may comprise regions, icons, text or figures (all of which may be analyzed).

In some cases, the direction of movement can also play a role, for example an edge generates a different output depending on whether the point of touch is moving across the edge, or along the edge. The output can also simulate certain types of materials where the feeling is different depending on which way the screen 22 is touched or rubbed. For instance, fur feels different depending on whether it is touched in the direction along the hairs of the fur, or against them. This may be accomplished by determining a texture direction of the feature. The texture direction may be a first texture along a first direction of the feature. The feature may also comprise a second different texture along a second different direction of the same feature. The first and second directions and first and second textures may be at the same area of the display 22. The texture direction may be defined by a color, intensity, sharpness, brightness or contrast of the feature displayed at the area of the touch screen 22. For example, as in the case described above where 'fur' is displayed on the screen 22, the color, intensity, sharpness, brightness or contrast of the feature can be associated with a texture direction of the feature at the area of the display 22 that is touched or pressed.

In some cases a finger/stylus being held still does not cause an acoustic/tactile output, but output is generated only when the finger/stylus is moving (a real-life example can be placing a finger on the edge of a paper sheet on a table, when the finger is still, the edge is not felt after a while, but when the finger is moved, the edge is felt again). This may be accomplished by operating the user sensory feedback system 24 to render the transducer 26 inactive for a period of time. Another example can be when a black color is displayed on a portion of the screen 22, this could indicate just a graphical background and, therefore, there is no need to provide any type of feedback at the display 22 (i.e. transducers 26 are not active). This can also apply when there is a change of the feature(s) displayed on the display 22.

Figure 2:
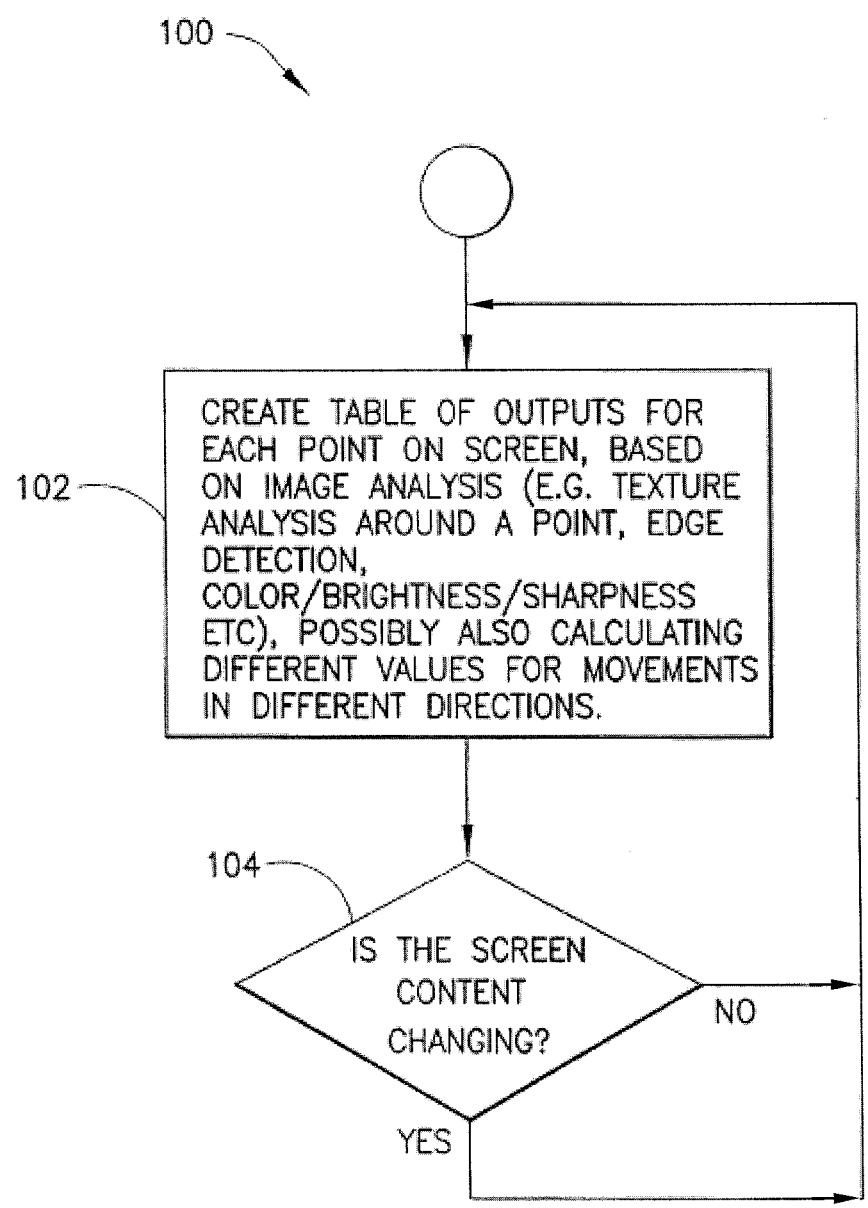
FIG. 2 is a flow chart representing an exemplary algorithm used in the electronic device shown in FIG. 1.

FIG. 2 illustrates a flow chart representing an exemplary algorithm of the disclosed device 10. The algorithm includes the following steps. Create table of outputs for each point on the screen 22, based on image analysis (e.g. texture analysis around a point, edge detection, color/brightness/sharpness etc.), possibly also calculating different values for movements in different directions (step 102). Is the screen 22 content changing (step 104)?

The algorithm allows for the audio and/or tactile feedback for each position to depend on the visual information of the area pressed in the touch screen 22. For example, the user sensory feedback system 24 can provide an audio and/or tactile feedback at the area of the touch screen 22 in response to a color, intensity, sharpness, brightness, or contrast of the feature displayed at the area of the touch screen 22. During usage, the user's finger or stylus hits the screen 22. No tactile feedback is necessarily generated yet. If no table of outputs for the point of touch exists (e.g. in a video case), the output for the point of touch is calculated. It can be dependent on movement so that when the finger/stylus is still, no output is generated.

Figure 3:
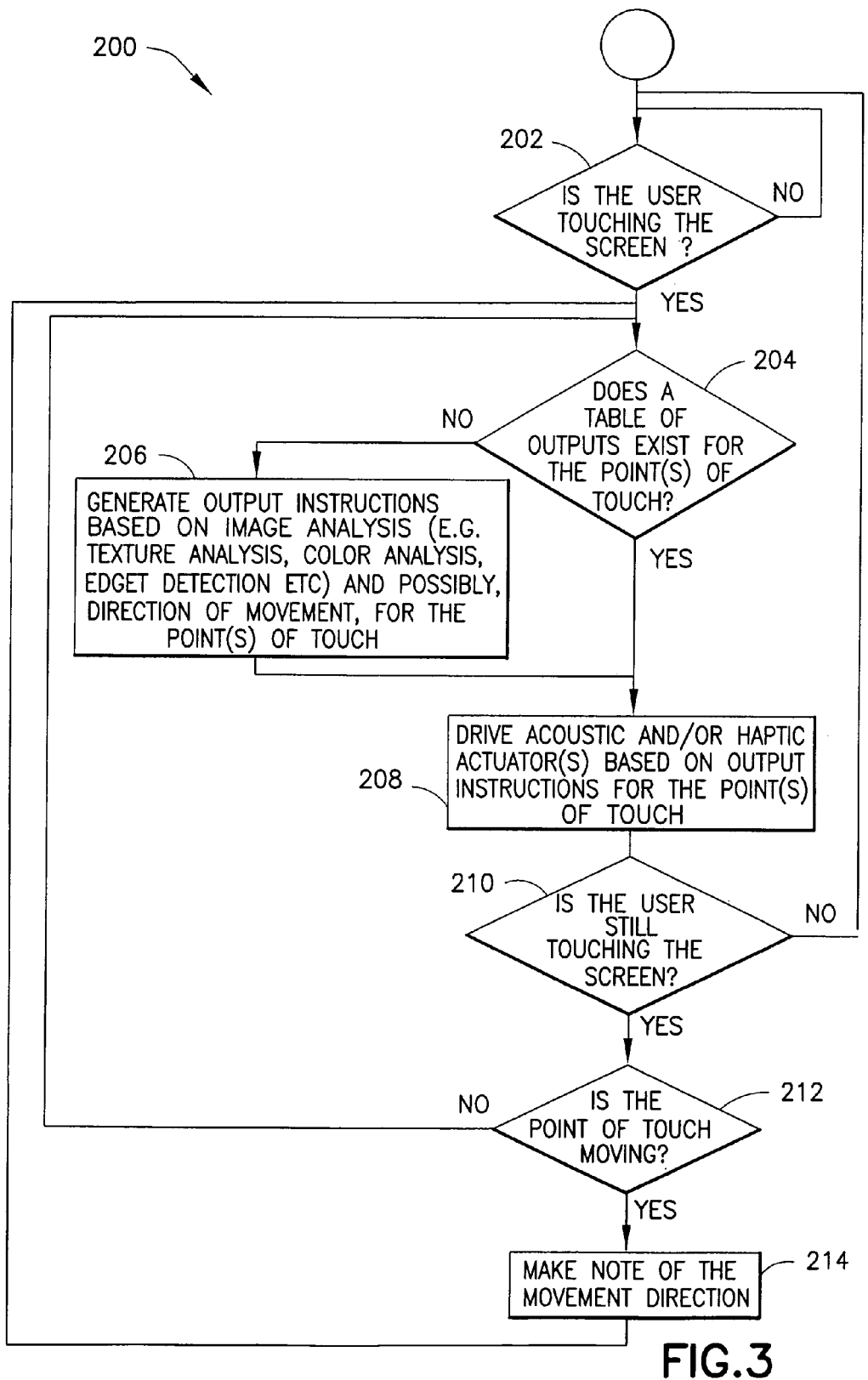
FIG. 3 is a flow chart representing another exemplary algorithm used in the electronic device shown in FIG. 1.

FIG. 3 illustrates a flow chart representing another exemplary algorithm of the disclosed device 10. The algorithm includes the following steps. Is the user touching the screen 22 (step 202)? Does a table of outputs exist for the point(s) of touch (step 204)? Generate output instructions based on image analysis (e.g. texture analysis, color analysis, edge detection etc) and possibly, direction of movement, for the point(s) of touch (step 206). Drive acoustic and/or haptic actuator(s) 26 based on output instructions for the point(s) of touch (step 208). Is the user still touching the screen 22 (step 210)? Is the point of touch moving (step 212)? Make note of the movement direction (step 214).

If the finger/stylus is kept on the screen 22 and moved, the system makes note of the direction of the movement, in case the table of outputs has different values for different directions for the point to which the finger/stylus moved.

The user sensory feedback system 24 may comprise transducers/actuators 26 at different areas of the touch screen. This allows for the user sensory feedback system 24 to respond to a touch at other areas of the touch screen 22. For example the user sensory feedback system 24 could continue working even if the pressed area changes coordinates (or area of the screen 22). Additionally, the touch screen 22 and the user sensory feedback system 24 may be configured to provide feedback (which for example, may be audio or tactile feedback) when the user's finger or stylus touches a border of the touch screen 22.

Figure 4:
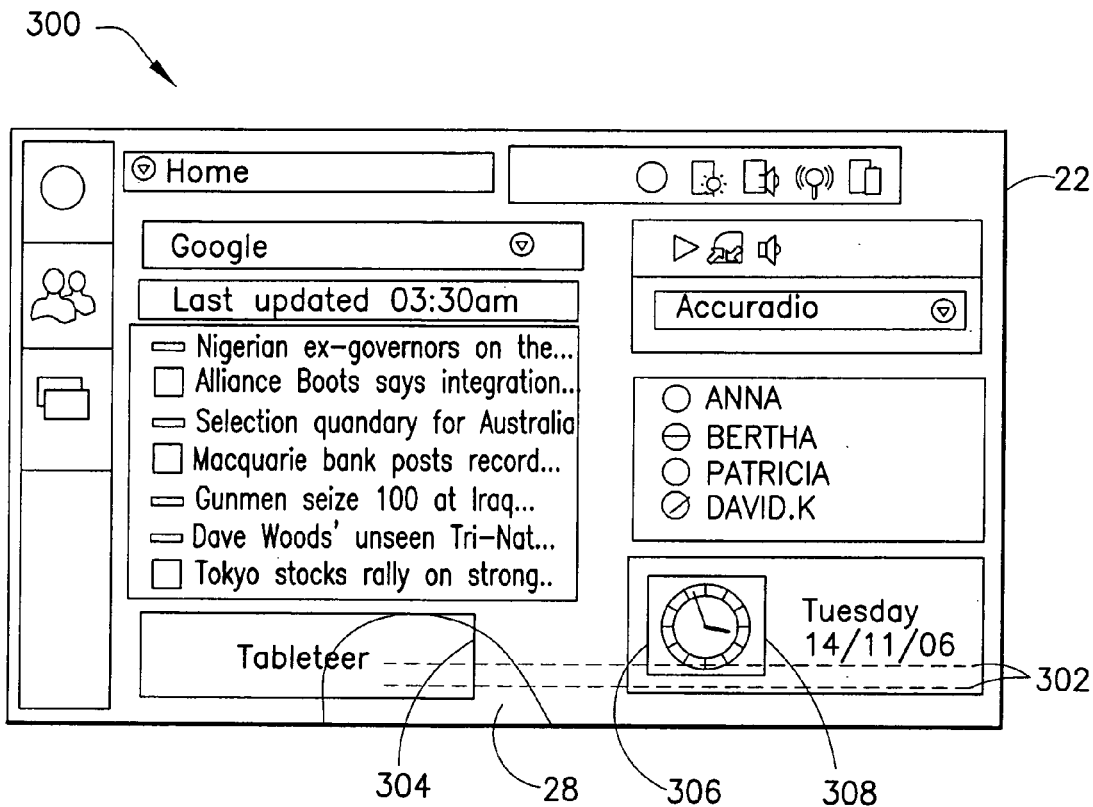
FIG. 4 is front view of a display screen of the electronic device shown in FIG. 1.
Figure 5:
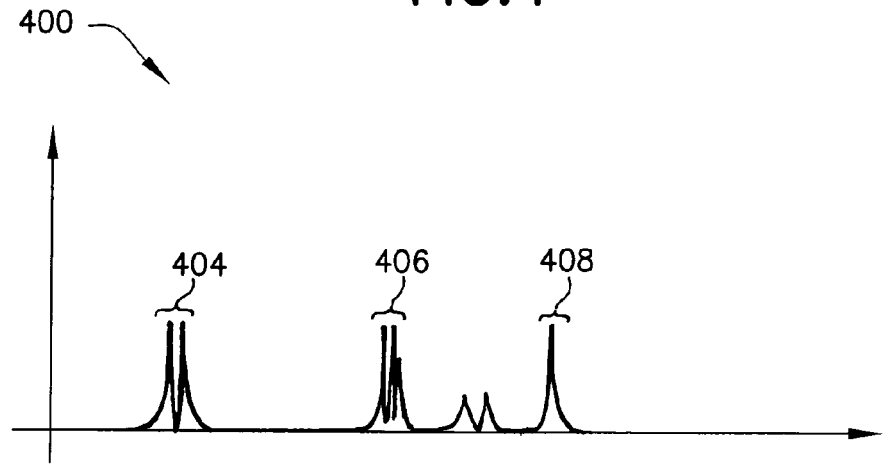
FIG. 5 is diagram of an area of the display screen shown in FIG. 4.

FIG. 4 illustrates an exemplary desktop environment 300 on the display 22 of the device 10, which may be a Nokia® N800 Internet Tablet™ for example. The table of outputs for the screen 22 may include for example, a rule that the greater the contrast between two pixels (in the direction of movement), the greater the output for the acoustic/tactile actuator(s). An example of this is shown in FIGS. 4 and 5. In FIG. 4, the user touches the screen 22, by moving a thumb or finger 28 along an area (illustrated by dotted lines 302) of the screen 22. An output of the area surrounding the dotted lines 302 is shown separately in FIG. 5. FIG. 5 is a diagram 400 illustrating the output signal to the user sensory feedback system 24 (which may comprise a piezoactuator/loudspeaker/etc., for example) when the finger 28 is on each spot of the area. The output signal is generated by analyzing the desktop area 300 with an edge detection algorithm for example. The edge detection algorithm converts the desktop area 300 into a "bump map" as shown in FIG. 5. For example, the edges 304, 306, 308 of the features displayed on the desktop 300 correspond to the peaks 404, 406, 408, respectively, shown in diagram 400.

Figure 6:
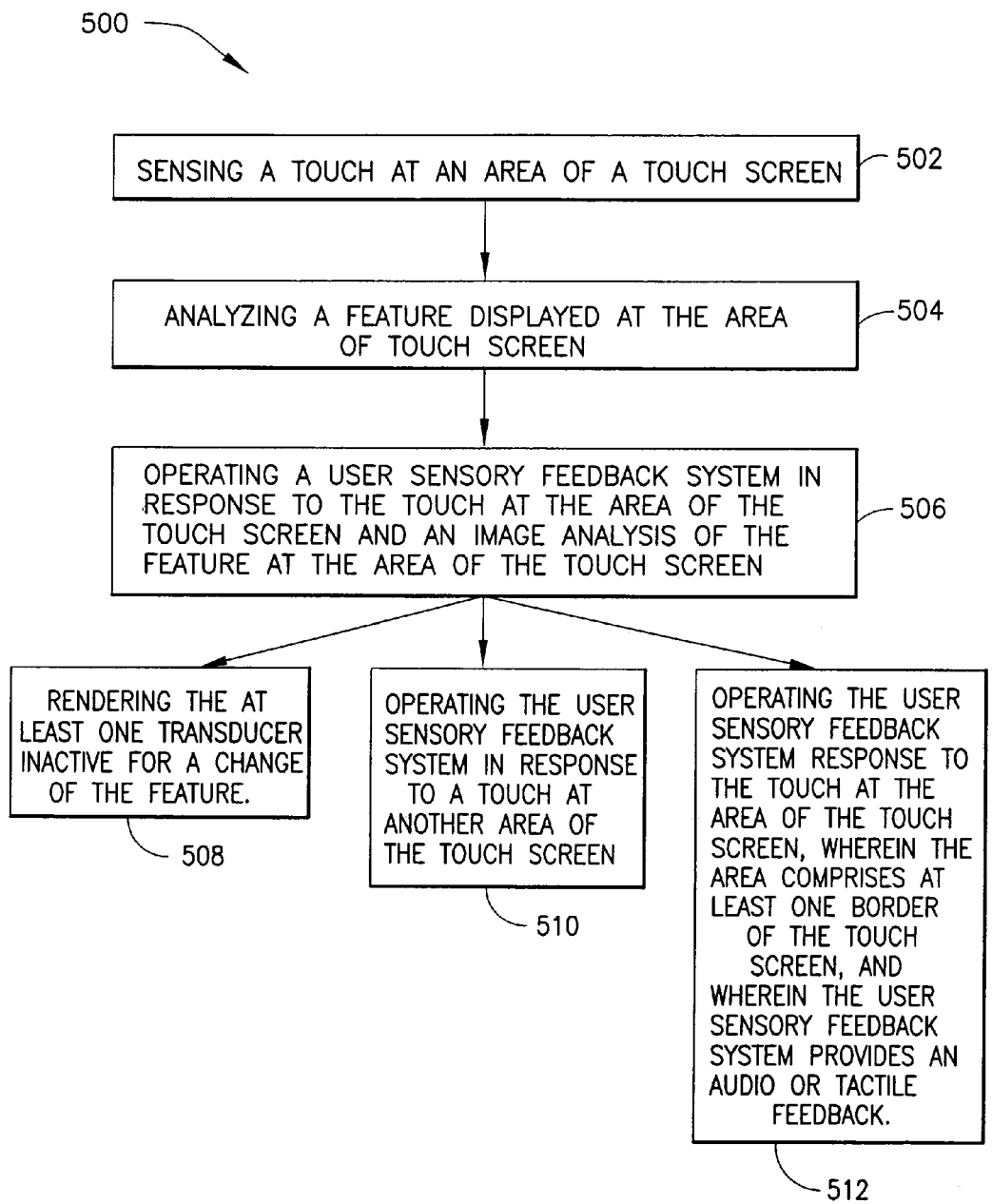
FIG. 6 is a block diagram of an exemplary method of providing feedback at the display screen of the electronic device shown in FIG. 1.

FIG. 6 illustrates an exemplary method 500 of providing feedback at the touch screen 22. The method 500 includes the following steps. Sensing a touch at an area of a touch screen 22 (step 502). The sensing may be by a piezoelectric sensor for example. Analyzing a feature displayed at the area of the touch screen 22 (step 504). And, operating a user sensory feedback system in response to the touch at the area of the touch screen 22 and an image analysis of the feature at the area of the touch screen 22 (step 506). This may be a change in a picture such as a slide show, or an animation for example. Rendering the at least one transducer 26 inactive for a change of the feature (step 508). Operating the user sensory feedback system in response to a touch at another area of the touch screen 22 (step 510). Operating the user sensory feedback system in response to the touch at the area of the touch screen 22, wherein the area comprises at least one border of the touch screen 22, and wherein the user sensory feedback system provides an audio or tactile feedback (step 512). It should be noted that any of the above steps may be performed alone or in combination with one or more of the steps.

Figure 7:
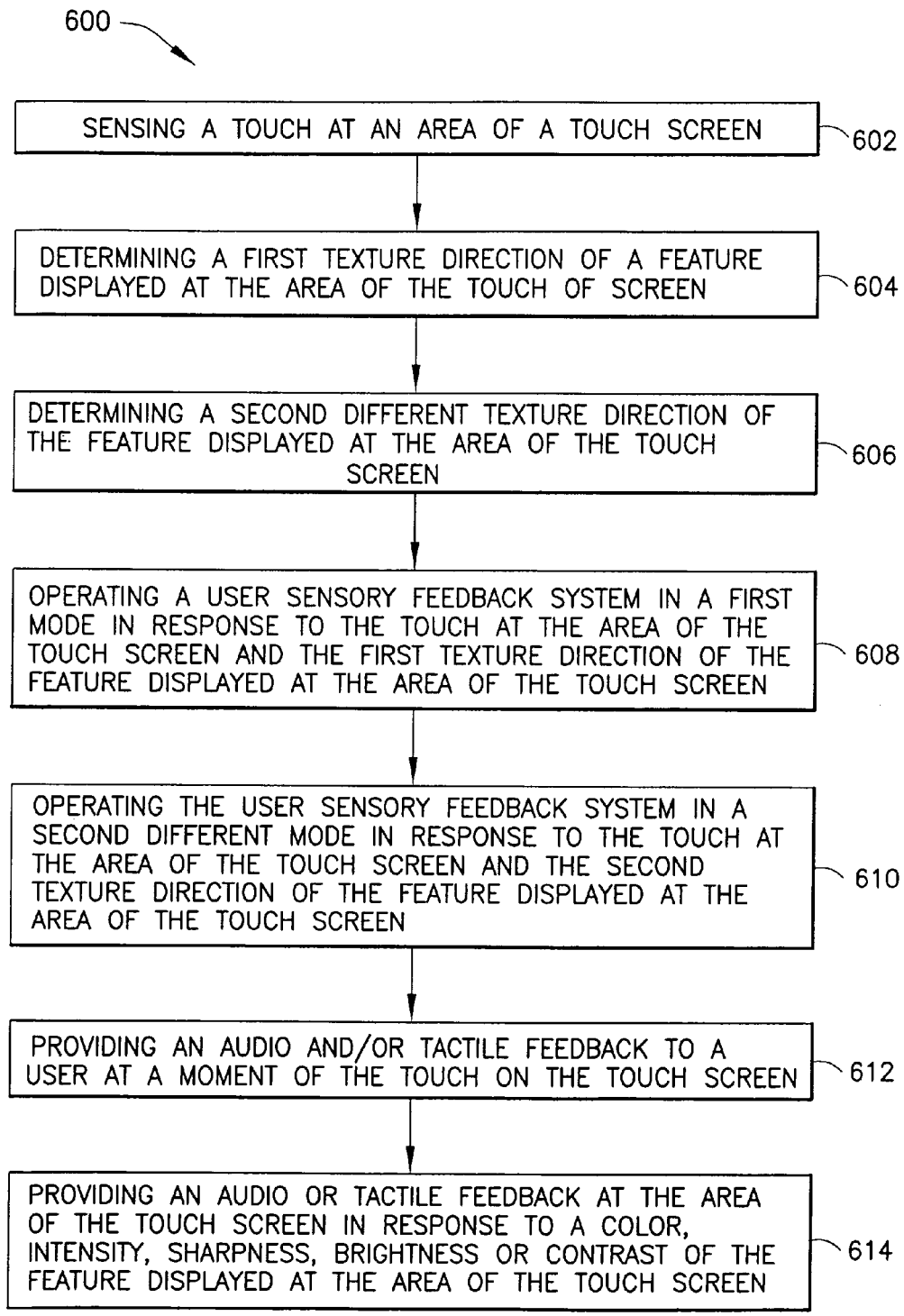
FIG. 7 is a block diagram of another exemplary method of providing feedback at the display screen of the electronic device shown in FIG. 1.

FIG. 7 illustrates another exemplary method 600 of providing feedback at the touch screen 22. The method includes the following steps. Sensing a touch at an area of a touch screen 22 (step 602). Determining a first texture direction of a feature displayed at the area of the touch screen 22 (step 604). Determining a second different texture direction of the feature displayed at the area of the touch screen 22 (step 606). Operating a user sensory feedback system in a first mode in response to the touch at the area of the touch screen 22 and the first texture direction of the feature displayed at the area of the touch screen 22 (step 608). Operating the user sensory feedback system in a second different mode in response to the touch at the area of the touch screen 22 and the second texture direction of the feature displayed at the area of the touch screen 22 (step 610). Providing an audio and/or tactile feedback to a user at a moment of the touch on the touch screen 22 (step 612). Providing an audio or tactile feedback at the area of the touch screen 22 in response to a color, intensity, sharpness, brightness, or contrast of the feature displayed at the area of the touch screen 22 (step 614). It should be noted that any of the above steps may be performed alone or in combination with one or more of the steps.

Figure 8:
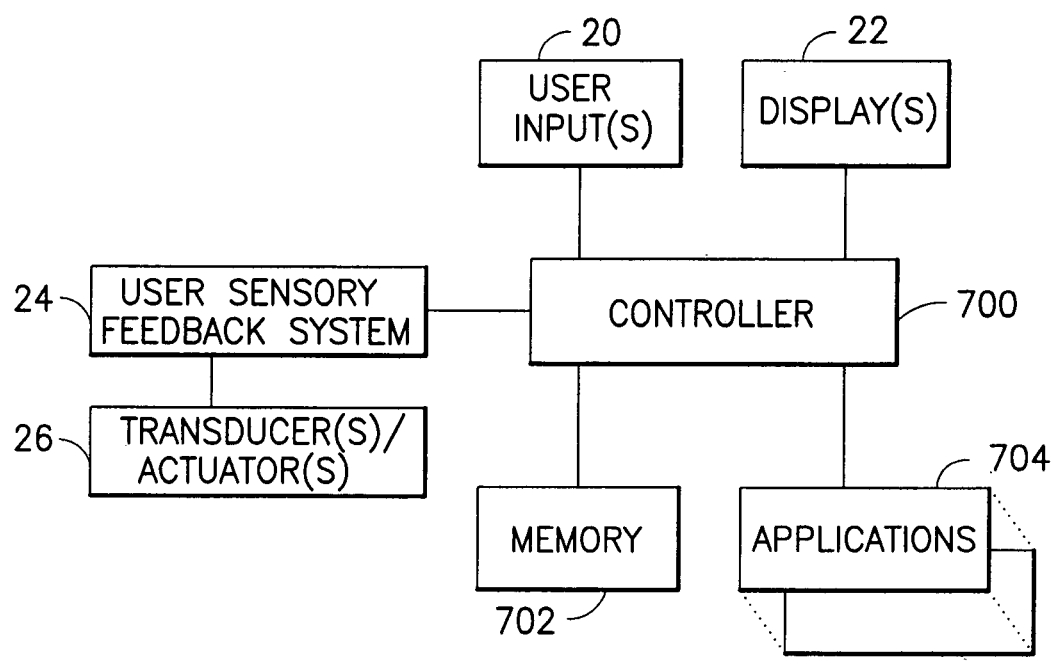
FIG. 8 is a schematic diagram illustrating components of the portable electronic device shown in FIG. 1.

Referring now also to FIG. 8, the device 10 generally comprises a controller 700 such as a microprocessor for example. The electronic circuitry includes a memory 702 coupled to the controller 700, such as on a printed circuit board for example. The memory could include multiple memories including removable memory modules for example. The device has applications 704, such as software, which the user can use. The applications can include, for example, a telephone application, an Internet browsing application, a game playing application, a digital camera application, etc. These are only some examples and should not be considered as limiting. One or more user inputs 20 are coupled to the controller and one or more displays 22 are coupled to the controller 700. The user sensory feedback system 24 (including the transducers/actuators 26) is also coupled to the controller 700. The device 10 is preferably programmed to automatically provide a feedback response at the display when there is a change in feature displayed on the touch screen 22. However, in an alternate embodiment, this might not be automatic. The user might need to actively select a change in the application being used/run.

In conventional configurations, there is unutilized potential in piezoelectric displays. The disclosed device 10 provides a desktop-like user interface for the user, and utilizes haptic feedback so that the user can feel different materials on the desktop. For instance, moving a cursor over a scrollbar can be felt on the user's hand, making it easier to hit it. Or, the background image of the desktop feels bumpy while the windows feel smooth. In short—the system creates an illusion that the desktop is made of a physical substance, providing tactile sensations in addition to the visual ones, increasing the usability of the system.

Although the transducer/actuator of the disclosed user sensory feedback system may generate additional sound and increase energy consumption, the device 10 provides significant advantages over the conventional configurations. The disclosed device 10 allows the user to 'feel' the items shown in the display in addition to seeing them. This adds to the usability, especially in a mobile context when the user's attention may be divided by providing feedback through several modalities is helpful.

The invention provides for analyzing the displayed image to create a "tactile map" of the screen content. The content can be, for example, just an image, or feature, on the screen or any other application. The image or feature can also be something else other than color. For example, a face detection algorithm could be performed on an image, and only produce haptic output when the user's finger is on a face. Or, in another example, a direction detection algorithm may be performed, wherein haptic output would be generated only on areas where there are vertical lines.

Additionally, it should be noted that the haptic output could be dependent on the direction in which the user's point of touch (i.e. the point where the finger or stylus is) is moving. Thus, if there are vertical lines on the screen, haptic output could be generated when the point of touch is moving across the lines (i.e. in the horizontal direction) but not when it's moving along the lines (i.e. the vertical direction). This way, the illusion of some surface structures could be generated.

The invention provides for tactile output to be based on the image analysis (or face detection) of what is on screen. Conventional configurations generally provide pre-generated content, wherein when a system detects that a cursor was moved over a window border, a pre-defined tactile force is produced. Conventional configurations also do not account for how features or images (such as a window border for example) look on the display screen. An advantage of the invention provides for a tactile force to be generated even if the window border is invisible (or not visible on the screen).

The invention provides for the screen contents under the cursor to be analyzed (image analysis), either beforehand (so that a "table of outputs" may be generated, similar to step 102 shown in FIG. 2) or during use (similar to steps 204 and 206 shown in FIG. 3). Additionally, if no "table of outputs" has been generated, then the output related to the current position could be immediately calculated.

In conventional configurations, the haptic output needs to be programmed beforehand, and therefore cannot be performed on some features or images, such as photos that the user has taken for example. The invention on the other hand, provides for the roughness of an image to be analyzed, and when the user's finger/stylus is moving on it, tactile output is generated accordingly. The invention also provides for the color or brightness of a feature or image to be analyzed. For example, a yellow color could be defined to produces a certain type of vibration. However, in alternate embodiments, even more delicate image processing could be performed.

The invention allows a feature on the touch screen to be based on image analysis, wherein the feature is under the point of touch where the cursor/stylus currently is. This provides a feature based on image analysis. This feature can be, for example, the color or brightness of the pixel under the point of touch. However, the features can be also something more complex, such as the overall roughness of the image in an area (of some pre-defined size) around the point of touch, for example. In another example, the feature could be the direction of the graphical texture around the point. In yet another example, whether the point of touch is on such area of the image where a face is detected to exist. This haptic output generation could also be dependent on the direction in which the point of touch is moving.

The invention adds value to the user experience when, for example, trying to simulate material properties in the displayed image/content, and using different tactile vibration patterns when sliding a finger across the touch screen.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
a housing section;
electronic circuitry mounted within the housing section;
a touch screen on the housing section, wherein the touch screen is configured to sense a touch at an area of the touch screen, and wherein the electronic circuitry is configured to analyze a feature displayed at the area of the touch screen; and
a user sensory feedback system proximate the housing section, wherein the user sensory feedback system is configured to perform a sensory feedback operation based, at least partially, upon a direction of movement of the touch at the area of the touch screen and upon an image analysis of the feature at the area of the touch screen, wherein different directions of movement along the feature displayed at the area generate different user sensory feedback operations, wherein the user sensory feedback system is configured to provide an audio and/or tactile feedback based, at least in part, on the image analysis of the feature at the area of the touch screen, wherein the apparatus is configured to perform a direction analysis relative to the feature and an edge detection corresponding to the feature when the image analysis is performed, and wherein the edge detection comprises an edge detection algorithm configured to detect an edge of a window border proximate the feature, and wherein the feedback is provided via a transducer based on the image analysis identifying at least one of intensity, sharpness, brightness, or contrast of the feature.

2. The apparatus of claim 1 wherein the user sensory feedback system is configured to provide the audio and/or tactile feedback to a user at the area of the touch screen.

3. The apparatus of claim 1 wherein the touch screen is configured to display a still image, a moving picture, or a video at the area of the touch screen.

4. The apparatus of claim 1 wherein the apparatus comprises a portable communication device.

5. The apparatus of claim 1 wherein the texture analysis comprises a texture analysis algorithm configured to analyze the roughness in a pre-defined area around each point on the screen.

6. The apparatus of claim 1 wherein the edge of the window border is at the feature, and wherein the user sensory feedback system is configured to provide an audio and/or tactile feedback based, at least in part, on the detected edge of the window border.

7. The apparatus of claim 6 wherein the edge detection algorithm is configured to covert the area of the touchscreen into a 'bump map' corresponding to detected edges at the area of the touchscreen.

8. An apparatus comprising:
a housing section;
electronic circuitry mounted within the housing section;
a touch screen on the housing section, wherein the touch screen is configured to sense a touch at an area of the touch screen, wherein the electronic circuitry is configured to determine a first texture direction of a feature displayed at the area of the touch screen, and wherein the electronic circuitry is configured to determine a second different texture direction of the feature displayed at the area of the touch screen, wherein the first texture direction comprises a direction along the area of the touch screen, and wherein the second texture direction comprises another different direction along the area of the touch screen; and
a user sensory feedback system proximate the housing section, wherein the user sensory feedback system is configured to operate in a first mode in response to the touch at the area of the touch screen and the first texture direction of the feature displayed at the area of the touch screen, and wherein the user sensory feedback system is configured to operate in a second different mode in response to the touch at the area of the touch screen and the second texture direction of the feature displayed at the area of the touch screen, wherein the user sensory feedback system is configured to perform a sensory feedback operation based, at least partially, upon a direction of movement of the touch at the area of the touch screen and upon an image analysis of the feature at the area of the touch screen, wherein different directions of movement along the feature displayed at the area generate different user sensory feedback operations, wherein the user sensory feedback system is configured to provide an audio and/or tactile feedback based, at least in part, on the image analysis of the feature at the area of the touch screen, wherein the apparatus is configured to perform a direction analysis relative to the feature and an edge detection corresponding to the feature when the image analysis is performed, and wherein the edge detection comprises an edge detection algorithm configured to detect an edge of a window border proximate the feature, and wherein the feedback is provided via a transducer based on the image analysis identifying at least one of intensity, sharpness, brightness, or contrast of the feature.

9. The apparatus of claim 8 wherein the user sensory feedback system comprises an electroacoustic transducer and/or an electromechanical transducer and wherein the user sensory feedback system is configured to provide an audio and/or tactile feedback to a user at the area of the touch screen.

10. The apparatus of claim 8 wherein the user sensory feedback system comprises a piezoelectric actuator.

11. A method comprising:
sensing a touch at an area of a touch screen;
analyzing a feature displayed at the area of the touch screen;
operating a user sensory feedback system in response to the touch at the area of the touch screen and an image analysis of the feature at the area of the touch screen, wherein the user sensory feedback system is configured to operate in response to a direction of movement of the touch at the area of the touch screen, wherein the user sensory feedback system comprises at least one transducer configured to produce an audio and/or tactile feedback output wherein the output is configured based on the direction of movement of the touch; and
rendering the at least one transducer inactive in response to a change in movement of the touch at the area of the touchscreen;
wherein the user sensory feedback system is configured to perform a sensory feedback operation based, at least partially, upon a direction of movement of the touch at the area of the touch screen and upon the image analysis of the feature at the area of the touch screen, wherein different directions of movement along the feature displayed at the area generate different user sensory feedback operations, wherein the user sensory feedback system is configured to provide an audio and/or tactile feedback based, at least in part, on the image analysis of the feature at the area of the touch screen, wherein a direction analysis relative to the feature and an edge detection corresponding to the feature is performed with the image analysis, and wherein the edge detection comprises an edge detection algorithm configured to detect an edge of a window border proximate the feature, and wherein the feedback is provided via the at least one transducer based on the image analysis identifying at least one of intensity, sharpness, brightness, or contrast of the feature.

12. The method of claim 11 wherein the operating the user sensory feedback system further comprises rendering the at least one transducer inactive for a change of the feature.

13. The method of claim 11 wherein the user sensory feedback system comprises an electroacoustic transducer and/or an electromechanical transducer.

14. The method of claim 11 wherein the operating of the user sensory feedback system further comprises operating the user sensory feedback system in response to a touch at another area of the touch screen.

15. The method of claim 11 wherein the operating of the user sensory feedback system further comprises operating the user sensory feedback system in response to the touch at the area of the touch screen, wherein the area comprises at least one border of the touch screen, and wherein the user sensory feedback system provides an audio or tactile feedback.

16. A method comprising:
sensing a touch at an area of a touch screen;
determining a first texture direction of a feature displayed at the area of the touch screen;
determining a second different texture direction of the feature displayed at the area of the touch screen;
operating a user sensory feedback system in a first mode in response to the touch at the area of the touch screen and the first texture direction of the feature displayed at the area of the touch screen; and
operating the user sensory feedback system in a second different mode in response to the touch at the area of the touch screen and the second texture direction of the feature displayed at the area of the touch screen;
wherein the user sensory feedback system is configured to perform a sensory feedback operation based, at least partially, upon a direction of movement of the touch at the area of the touch screen and upon an image analysis of the feature at the area of the touch screen, wherein different directions of movement along the feature displayed at the area generate different user sensory feedback operations, wherein the user sensory feedback system is configured to provide an audio and/or tactile feedback based, at least in part, on the image analysis of the feature at the area of the touch screen, wherein a direction analysis relative to the feature and an edge detection corresponding to the feature is performed with the image analysis, and wherein the edge detection comprises an edge detection algorithm configured to detect an edge of a window border proximate the feature, and wherein the feedback is provided via the at least one transducer based on the image analysis identifying at least one of intensity, sharpness, brightness, or contrast of the feature.

17. The method of claim 16 wherein the user sensory feedback system comprises an electroacoustic transducer and/or an electromechanical transducer.

18. The method of claim 16 wherein the operating of the user sensory feedback system further comprises providing an audio and/or tactile feedback to a user at a moment of the touch on the touch screen, and wherein the image analysis comprises an algorithm configured to be run before the moment of the touch on the touch screen.

19. The method of claim 16 wherein the determining of the first and second texture directions of the the feature further comprises determining a color, intensity, sharpness, brightness, and/or contrast of the feature displayed at the area of the touch screen, wherein the first texture direction comprises a direction of movement along the area of the touch screen, and wherein the second texture direction comprises another different direction of movement along the area of the touch screen.

20. The method of claim 16 wherein the operating of the user sensory feedback system further comprises providing an audio or tactile feedback at the area of the touch screen in response to an image analysis of a color.

21. The method of claim 16 wherein the feature comprises a still image, a moving picture, or a video.

22. The method of claim 16 wherein the feature comprises regions, icons, text and/or figures.

23. The method of claim 16 wherein the operating of the user sensory feedback system further comprises providing an audio or tactile feedback at the area of the touch screen in response to an image analysis of an intensity, sharpness, or brightness of the feature displayed at the area of the touch screen.

24. A program storage device readable by a machine, tangibly embodying a program of instructions executable by the machine for performing operations to provide feedback based on a feature displayed on a touch screen, the operations comprising:

sensing a touch at an area of the touch screen;

analyzing a feature displayed at the area of the touch screen; and operating a user sensory feedback system based, at least partially, upon the sensed touch at the area of the touch screen and upon a determined texture direction and/or or a graphical change, at the analyzed feature displayed at the area of the touch screen, wherein the user sensory feedback system is configured to perform a sensory feedback operation based, at least partially, upon a direction of movement of the touch at the area of the touch screen and upon an image analysis of the feature at the area of the touch screen, wherein different directions of movement along the feature displayed at the area generate different user sensory feedback operations, and wherein the user sensory feedback system is configured to provide an audio and/or tactile feedback based, at least in part, on the image analysis of the feature at the area of the touch screen, wherein a direction analysis relative to the feature and an edge detection corresponding to the feature is performed with the image analysis, and wherein the edge detection comprises an edge detection algorithm configured to detect an edge of a window border proximate the feature, and wherein the feedback is provided via a transducer based on the image analysis identifying at least one of intensity, sharpness, brightness, or contrast of the feature.

* * * * *